May 1, 1923.
H. E. BREMER
STEERING GEAR FOR MOTOR VEHICLES
Filed July 16, 1919
1,453,432
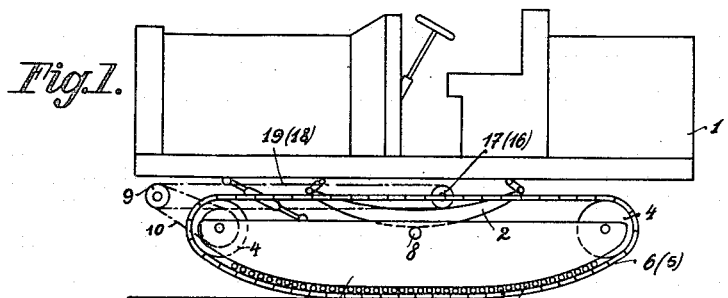
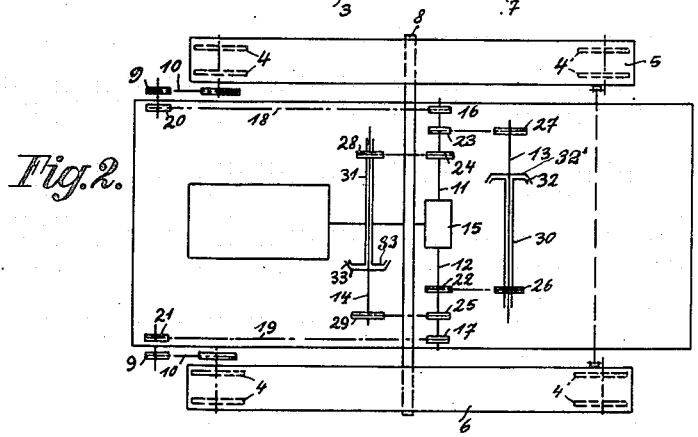
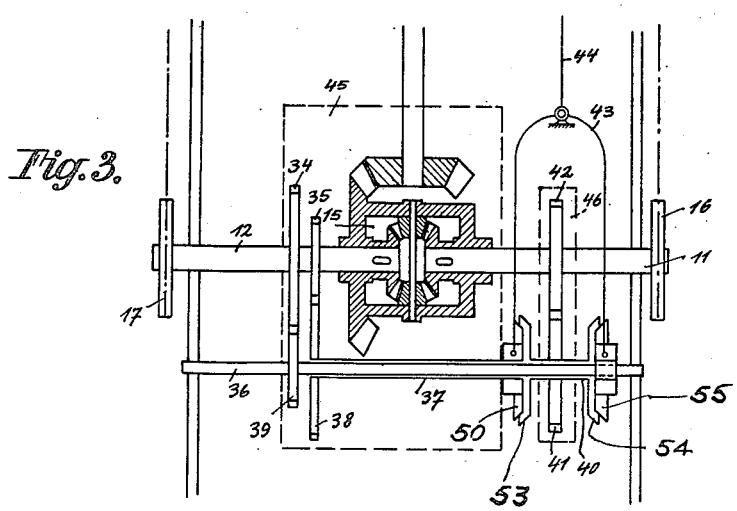
Inventor.
Hugo E. Bremer.
by Wilkinson & Giusta.
Attorneys.

Patented May 1, 1923.

1,453,432

UNITED STATES PATENT OFFICE.

HUGO E. BREMER, OF NEHEIM, WESTPHALIA, GERMANY.

STEERING GEAR FOR MOTOR VEHICLES.

Application filed July 16, 1919. Serial No. 311,348.

*To all whom it may concern:*

Be it known that I, HUGO E. BREMER, manufacturer, a citizen of Germany, and resident of Neheim, Westphalia, Germany, have invented new and useful Steering Gear for Motor Vehicles, of which the following is a specification.

The present invention relates to a steering gear for vehicles having two road chains or driving chains, in which the speed of these road or driving chains may be made to differ from each other to a given degree by means of special gears provided beside the differential or compensating gear fitted to the vehicle.

The arrangement of such steering gears according to the present invention is essentially such that for steering in the one or the other direction a connection is made between the shafts of the two chains by interposition of two or more clutches or the like, so that when the one or the other clutch or the like is engaged the driving power is transferred from the one chain shaft to the other and thereby the different speeds of the chains are produced.

According to the present invention preferably such clutches are employed, which allow of the steering effect coming only gradually into force so that the same will not be as rough or jerky as when toothed clutches are employed, which, however, may under circumstances also be used with the arrangement forming the object of the present invention. The one advantage of the steering gear according to the present invention over other arrangements consists, therefore, therein that there need be no sudden brake effects or sudden engagements by which heretofore much power was wasted and the machinery and running parts subjected to much wear.

The accompanying drawing illustrates by way of example two constructional forms of the invention:

Fig. 1 is a side elevation of a motor vehicle having two road chains embodying the one modification of the steering gear according to the present invention.

Fig. 2 is a plan of the vehicle, the body of the car being supposed to be removed.

Fig. 3 illustrates another modification of the steering gear.

In the drawing a motor vehicle is shown the body 1 of which rests on two chain gears by means of which the car is enabled to travel and to be steered. These chain gears, which are connected by means of springs 2 to the frame of the vehicle, each consist of a supporting rail or the like 3, at the ends of which chain wheels or pinions (or also pairs of pinions) 4 are provided, over which runs an endless road chain or driving chain 5 or 6, respectively. The said supporting rail 3 is fitted along its lower side with a plurality of rollers 7, against which the chains 5 and 6, respectively, run.

The supporting rail, frame or the like 3 is slanted off at its front end or gradually ascends so as to form an inclined run for the chain between the pinions 4 and the bearing section, whereby the vehicle is better enabled to climb over obstructions in the road.

The road or driving chains 5 and 6, respectively, are composed in the usual manner of tread plates hinged to each other. The arrangement is preferably such, that on each tread plate there is one roller in the longitudinal extension of the car, and the chain cannot be sagged through along its effective surface.

These rollers may be journalled either on the chain or on the supporting rail or the like. Also loose rollers may be disposed between the said rail or the like and the chain, Another modification may consist in arranging a roller chain running over the sprockets or pinions and travelling between the supporting rail and the road chain. Also combinations of the roller supporting devices described may be employed. So, for example, rollers may be disposed both on the supporting rail and on the tread plates.

The road chain gears are disposed to rock or tilt on a horizontal axis disposed at their center, each chain independently by itself; stops being provided to limit the stroke at a given point. Hinged stays or other means are provided for preventing a lateral displacement.

The said road or driving chains 5 and 6 are preferably driven by means of a sprocket gear 9 arranged ahead of the same, the driving chain 10 of which will exert a pull on the forward sprocket 4 of the driving chains 5 or 6, respectively.

The power is transmitted to the road chains from two shafts, the socalled differential shafts 11 and 12 immediately to the pinions, whereas for steering purposes the power is transmitted over separate countershafts 13 and 14, respectively.

The principle forming the subject matter of the present invention consists now, therein that when the car is taking a curve the one respective road chain shaft and thereby also the respective road chain is by engagement of the respective countershaft driven at a greater speed than the other road chain shaft and road chain, respectively, the power for increasing the speed of the one shaft being drawn by means of the said countershaft from the other shaft.

As shown in the drawing the two chain shafts 11, 12 are driven at their center from a differential or other compensating gear 15; for a straight run this drive is effected at the same speed for both shafts. The sprocket wheels 16, 17, which are fitted to the ends of said shafts 11 and 12, respectively, transmit the drive through chains 18 and 19, respectively over sprockets 20, 21 by aid of countershafts to the road chains 5 and 6, respectively. To the shafts 11, 12 are further fitted two sprockets each of suitable diameters, 22, 23 and 24, 25, respectively, from which chains run to the sprockets 26, 27 and 28, 29, respectively, fitted to the countershafts 13 and 14, respectively, or hollow shafts 30 and 31, respectively, fitted to said countershafts 13, 14. Said hollow shafts may, then, be coupled by means of clutches to the respective countershafts, said clutches each comprising a slidable clutch member or clutch half 32 and 32', respectively, and a fixed clutch member or clutch half 33 and 33', respectively.

When, now, the car is to turn to the left, the clutch 32 32' is engaged and the hollow shaft 30, which until then has by means of sprocket 22 been driven idle, will by means of its clutch member 32 and the other clutch member 32' on the countershaft 13 drive the latter and with it the sprocket 27. The power will, then, be transmitted over this sprocket 27 and sprocket 23 to the driving chain shaft 11 and thence through sprocket 16, chain 18 and the sprocket 20 and the right hand chain transmission 9, 10 to the road chain, 5. As the hollow shaft 30 is coupled with the countershaft 13 the sprocket 27 having the larger diameter will drive onto the sprocket 23 having a smaller diameter whereby the speed is increased, whilst, before the clutch was engaged, the countershaft 13 revolved loose in the hollow shaft 30, the two shafts running at different speeds.

If on the other hand the car is to turn to the right, the clutch 33, 33' is engaged, whereby the same effect is obtained as with clutch 32 32'. In the present instance the clutch half 33 on the hollow shaft 31 driven by sprocket 28 will, on being engaged with its other half drive the latter and therewith the countershaft 14. The power is transmitted by the larger sprocket 29 fitted to the end of the countershaft 14 to the smaller sprocket 25 on the shaft 12. This shaft 12 drives through the sprocket 17 and chain 19 the sprocket 21, which through the left hand chain transmission 9, 10 drives the front pinion 4 of the road chain 6.

The clutches 32 32' and 33 33' are operated by any suitable means controlled by the steering wheel, and since, as hereinbefore said, friction clutches are preferably employed for the transmission of the power, the steering effect on the car is easily regulated and may be performed in smooth manner. The friction clutches may, the same as elastic clutches be either fully or only partly engaged. When the two disc shaped clutch halves are slightly pressed against each other, they can slip on each other, whereas when they are tightly pressed against each other, the full effect is obtained without any slipping.

By such means the speeds of the two road chains may be brought into a given ratio to each other, by the steering lever being moved over a dial with marked stops or abutting against such stops and being held in predetermined positions by notches.

With the steering gear constructed in this manner the advantage is secured that no disengaging of gears is necessary as with the ordinary speed gears; the differential driving shafts will by means of chains drive two separate transmission gears, which will cause the one chain to travel faster than the other, when the one or the other transmission gear is operated by the engaging of the respective clutch. There are, thus, two different clutches, of which only the one or the other need be engaged to drive the one or the other road chain at a greater speed.

In the constructional form shown in Fig. 3 the arrangement is essentially such that the gears which produce the increase of the speed of the one or the other road chain for steering the car are disposed close to the differential gear or the like, and enclosed in one or several casings, so that they are continuously supplied with grease. For allowing of making the transmission gears as compact as possible, the two shafts required for the transmission of the power are instead of next to each other as in the aforementioned arrangement, disposed within each other, the one being a hollow shaft. Also the fixed clutch halves or clutch members are preferably fitted to a hollow shaft, and the slidable clutch halves or clutch members to the inner shaft or partly to a hollow shaft.

The further arrangement according to Fig. 3 is as follows:

From the usual differential or equalizing gear 15 which is driven by the motor, the shafts 11 and 12 project at the sides, transmitting the power for driving the road chains by means of the pinions 16 and 17. To the shaft 12 are further fitted gears 34 and 35 which have each a different number of teeth. Parallel to the shafts 11 and 12 is disposed the solid countershaft 36 on which runs loosely a hollow shaft 37. On the one end of this hollow shaft 37 is fitted a gear 38 which meshes with the gear 35 on shaft 12, and a slidable clutch member 50. To the said shaft 36 is further fitted a gear 39 meshing with gear 34 on shaft 12, and a short hollow shaft 40 forming an extension of hollow shaft 37 and having on opposite ends fixed clutch members 53 and 54, respectively, whilst the sliding clutch member 55 corresponding to member 54 is fitted to the solid shaft 36. On the short hollow shaft 40 is furthermore fixedly fitted a gear 41 meshing with a gear 42 fitted to the shaft 11.

When the equalizing gear is operated, the two road chains will be driven at the same speed.

When, now the vehicle is to turn to the left, the right road chain will have to run at a greater speed than the left. For obtaining this the solid shaft 36 is engaged by means of the clutch 54, 55, so that the meshing gears 34 and 39, which are at a corresponding ratio to each other will through the solid shaft 36, the short hollow shaft 40 coupled to the hollow shaft 37 by means of clutch 54, 55, the gear 41 thereon, the gear 42 on shaft 11 having the same number of teeth as gear 41, and the pinion or sprocket 16 drive the right road chain at a higher speed than the left.

When the vehicle is to turn to the other side, i. e. to the right, the operation is reversed. Clutch 50, 53 is engaged, so that the power is transmitted from the differential shaft 12 through gears 42, 41, the clutch 53, 50, the hollow shaft 37 and the gears 38, 35. By the pinion or sprocket 17 fitted to shaft 12 the right road chain will thereby receive a greater speed. The shiftable clutch members 50 and 55 are preferably moved to and fro, or engaged and disengaged by means of a fork 43 actuated by a common steering lever 44 so that it will be impossible for them to be simultaneously engaged.

The casing 45 encloses the whole differential gear and also the greater part of the countershaft whilst another casing 46 encloses the two constantly meshing gears 41, 42, whereby an encased gearing is formed and a permanent sufficient lubrication is ensured.

When the vehicle is desired to turn on its own axis one of the known devices such as a pawl, free wheel gear, strong brakes or the like may be fitted to each of the road chains, so that steering may be effected by differential speeds or also by completely stopping the one or the other road chain.

I claim:

In a steering gear for motor vehicles having a pair of road chains, the combination with two chain shafts adapted to be operated by the motor for driving said road chains, a differential gear connecting said chain shafts to the motor, two sets of auxiliary shafts arranged in pairs one within the other, two pairs of clutch members fitted to said auxiliary shafts for individually coupling the same and said chain shafts together, and means for transferring in a given ratio the power from one chain shaft to the other whereby to produce a difference in the speeds of operation of said road chains.

In testimony whereof, I have affixed my signature, in presence of two witnesses, this second day of May, 1919.

HUGO E. BREMER.

Witnesses:
RULEMANN FRHR. V. ROËLL,
OTTO GRÜTZMULLER.